May 15, 1951 W. D. CANNON 2,552,884

OSCILLOSCOPE SYSTEM

Filed Jan. 21, 1947 5 Sheets-Sheet 1

INVENTOR
W. D. CANNON
BY [signature]
ATTORNEY

May 15, 1951 W. D. CANNON 2,552,884

OSCILLOSCOPE SYSTEM

Filed Jan. 21, 1947 5 Sheets-Sheet 2

INVENTOR
W. D. CANNON
BY M. J. Reynolds
ATTORNEY

May 15, 1951 W. D. CANNON 2,552,884

OSCILLOSCOPE SYSTEM

Filed Jan. 21, 1947 5 Sheets-Sheet 3

INVENTOR
W. D. CANNON
BY
M. J. Reynolds
ATTORNEY

INVENTOR
W. D. CANNON
BY M. J. Reynolds
ATTORNEY

May 15, 1951 W. D. CANNON 2,552,884

OSCILLOSCOPE SYSTEM

Filed Jan. 21, 1947 5 Sheets-Sheet 5

INVENTOR
W. D. CANNON
BY [signature]
ATTORNEY

Patented May 15, 1951 2,552,884

UNITED STATES PATENT OFFICE 2,552,884

OSCILLOSCOPE SYSTEM

William D. Cannon, Metuchen, N. J., assignor to The Western Union Telegraph Company, New York, N. Y., a corporation of New York Application January 21, 1947, Serial No. 723,232

28 Claims. (Cl. 315—29)

This invention relates to improvements in oscilloscope systems and in particular to oscilloscopes intended for viewing high frequency electrical phenomena either periodic or transient in nature.

Practical oscilloscope devices of the cathode ray type in general comprise four essential elements, and these may be supplemented by additional elements designed to serve special purposes. The four essential parts are the cathode ray tube with its associated power supplies, a time base, or sweep circuit, for the purpose of moving the cathode ray beam across the screen of the tube in the forward direction, a discharge circuit for the purpose of returning the beam to the starting point, and an amplifier designed to amplify and control the volume of the signal current or other phenomena under observation. This invention relates particularly to the time base circuit, the discharge circuit, and the signal amplifier.

One of the objects of the invention is to provide an oscillograph time base of the constant current type employing negative feedback to permit linear delineations at high frequencies and at very high beam velocities.

Another object is to provide a time base which may be easily and positively synchronized with the signal under observation and in which the beam velocity is independent of the synchronizing potential.

A further object is to provide a time base operable at large ratios between the applied frequency and the sweep repetition rate.

A still further object is to provide a time base in which the repetition rate is independent of the applied voltage.

Still another object is to provide a time base which utilizes a substantial percentage of the applied voltage.

Another object is to provide a time base in which the forward and return traces are both substantially linear and may be used simultaneously for delineating the same signal.

A further object of the invention is to provide a signal amplifier for use in connection with either the signal or sweep deflection plates of the oscilloscope which will transmit very wide frequency bands substantially free of frequency or phase distortion.

Another object is to provide a signal amplifier possessing high gain and high voltage output, freedom from transient distortion, and which permits easy adjustment of its amplifying characteristics.

Other and further objects of the invention reside in the several unique circuit combinations of cathode ray tube, time base circuit, discharge circuit and signal amplifier which together provide an oscilloscopic device of great utility for the observation of very rapid periodic and transient phenomena.

Oscilloscope time bases usually consist of a condenser charging circuit designed to provide a saw-tooth type of wave in which a gradually rising voltage during charge is applied to the horizontal plates of the oscilloscope to deflect the beam on its forward trace, while the more rapid discharge voltage serves to return the trace to its starting point. To secure distortionless delineation of the wave shape on the screen, the outlines of this saw-tooth wave should be as nearly linear as possible and this is achieved ordinarily by charging and discharging the condenser at a constant current rate. For delineating very high frequencies, the velocity of the beam and consequently the charging current of the condenser become proportionately very high. The relationship between condenser capacity and charging current is given by $$\frac{CV}{1000} = \text{charging current in milliamperes} \qquad (1)$$

where

V=volts per micro-second
C=capacitance in $\mu\mu$farads

At very high frequencies if the individual waves are to be adequately extended on the screen, voltages varying at rates of several thousand volts per micro-second are required. From Equation 1 above, the charge or discharge of a condenser as small as 25 $\mu\mu$f. at the rate of 6000 volts per micro-second requires a constant current of 150 milliamperes. Hence the importance of keeping the condenser at a low value is evident, the minimum capacitance becoming that of the elements of the regulating vacuum tubes themselves in addition to the capacitances of the associated circuit elements and wiring. Since tube capacities are quite significant in this frequency range, a charging circuit should be chosen which permits the use of the smaller sizes of vacuum tubes and circuit elements and so positions them that the final composite capacity is as small as possible.

This specification illustrates a number of such constant current charging circuits in which an impedance consisting of resistance or inductance, or both, in series with the space path of a triode vacuum tube, or other tube triode connected, and a source of D. C. potential regulate the charging current to a small sweep condenser. By the unique choice of circuits the spurious capacities which lie in parallel to the sweep condenser are minimized so that in certain of the circuits when the sweep condenser has been reduced to zero, the residual capacity may be reduced to as low as 25 $\mu\mu$f. or even lower. With these circuits, and using standard vacuum tubes and cathode ray tubes it has been possible to view satisfactorily frequencies of 150 megacycles and higher. This impedance provides negative feedback via a condenser in the grid circuit. The series impedance itself together with the large negative feedback which it produces serve to hold the condenser charging current to a remarkably constant rate.

The several embodiments of the invention can best be understood by reference to the accompanying drawings in which.

Figure 15:
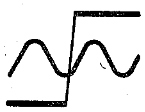
Figure 16:
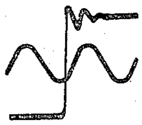
Figure 11:
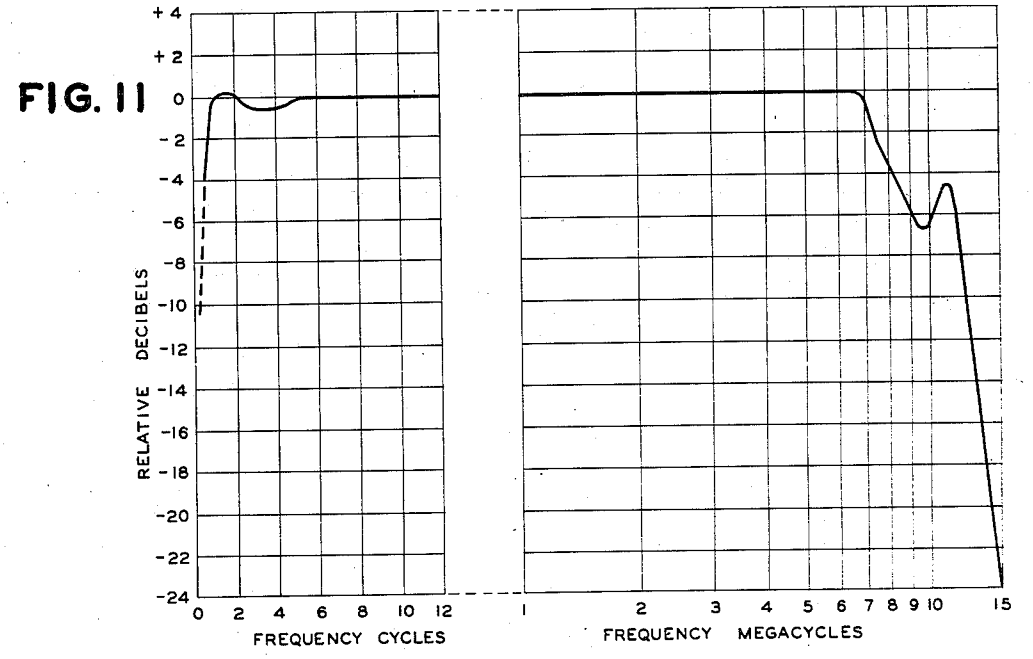
Figure 12:
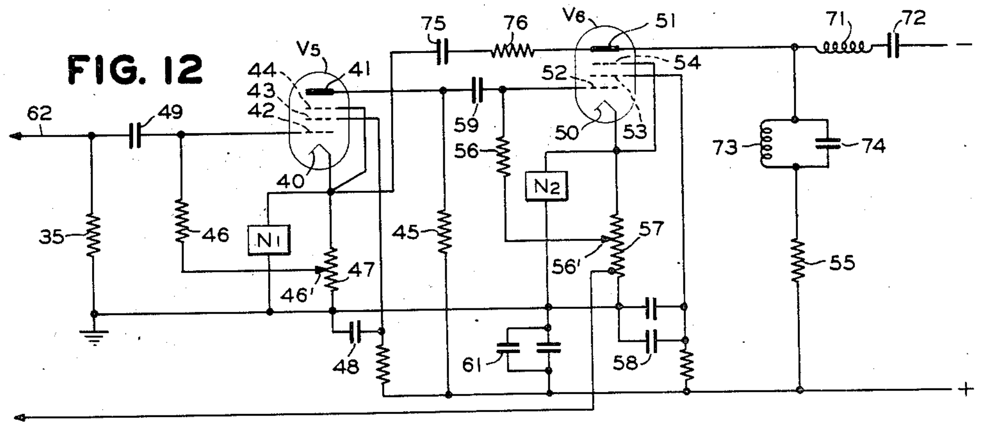
Figure 13:
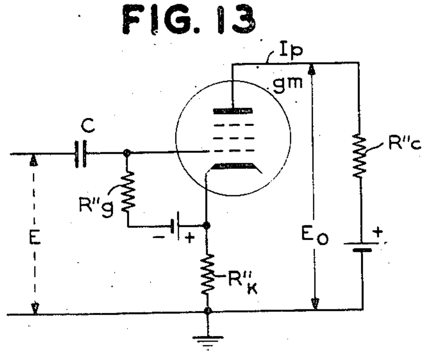
Figure 14:
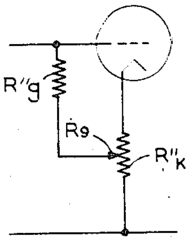

Fig. 11 gives a frequency characteristic of the improved amplifier;

Fig. 12 illustrates another version of the high frequency amplifier;

Figs. 13 and 14 are simplified figures useful in development of the theory of the amplifier of Fig. 12; and Figs. 15 and 16 illustrate typical responses of the oscilloscope system to high frequency transient waves.

In order to explain the operation of the invention, reference will first be made to Fig. 1. The figure includes a cathode ray oscilloscope tube 1, which may be of conventional type but when used for high frequencies should be of a design intended for use at these frequencies. The tube possesses the usual elements consisting of the cathode 2, grid 3 for controlling the intensity of the beam, focusing electrodes 4 and 5, a pair of vertical deflection plates 6, and a pair of horizontal deflection plates 7. The tube receives the requisite operating potentials from a potentiometer 8 connected to any suitable source of supply. A filter 9, which may be of the resistance-capacity type as shown, is included in series with the intensity control grid for the purpose of preventing modulation of the beam intensity by either the signal or sweep voltages which, at the high frequencies under consideration, may occur as a result of the transfer of voltages through the capacity of the tube and wiring.

For providing the horizontal deflection of the beam, a time base circuit is connected to the plates 7 via condenser $C_6$ and comprises a sweep condenser $C_t$ arranged to be charged through a charging circuit including the battery 10, a tube $V_1$ (which may be a triode or other type of tube triode connected, having a plate 11, grid 12, and cathode 13), the inductance $L_1$, and the resistance $R_k$. The inductance $L_1$ when not required may be short-circuited by the switch 14 as indicated. Associated with the grid circuit of the tube are the series condenser $C_g$ and the grid leak resistance $R_g$. The time constant of this combination should be such that the voltage drop across $C_g$ does not vary appreciably throughout the time base cycle for the lowest repetition frequency considered.

To discharge the condenser $C_t$ and return the cathode ray beam to the starting point a discharging circuit of conventional type is provided which comprises the gas tube $V_2$ (provided with plate 15, grid 16 and cathode 17), a resistor $R_3$ for regulating the discharge current and to protect the gas tube, a self-bias resistor $R_2$ with by-passing condenser $C_4$, and a regulating grid leak resistance $R_1$. The self-bias resistance $R_2$ is adjusted to provide negative bias to the grid 16 such that the tube will break down at the predetermined maximum voltage across the condenser $C_t$. For purposes of synchronizing the sweep circuit with the signal under observation, the grid circuit of the discharge tube is appropriately associated with the signal circuit which as illustrated in this case consists of a variable connection SC to the self-bias resistor 57 of the output tube $V_6$ of the signal amplifier. This circuit may include the isolating elements $C_3$ and $R_6$. The signal amplifier does not enter further into the operation of the sweep circuit and consideration of this device will be deferred until after the various embodiments of the time base circuits have been explained.

Figure 1:
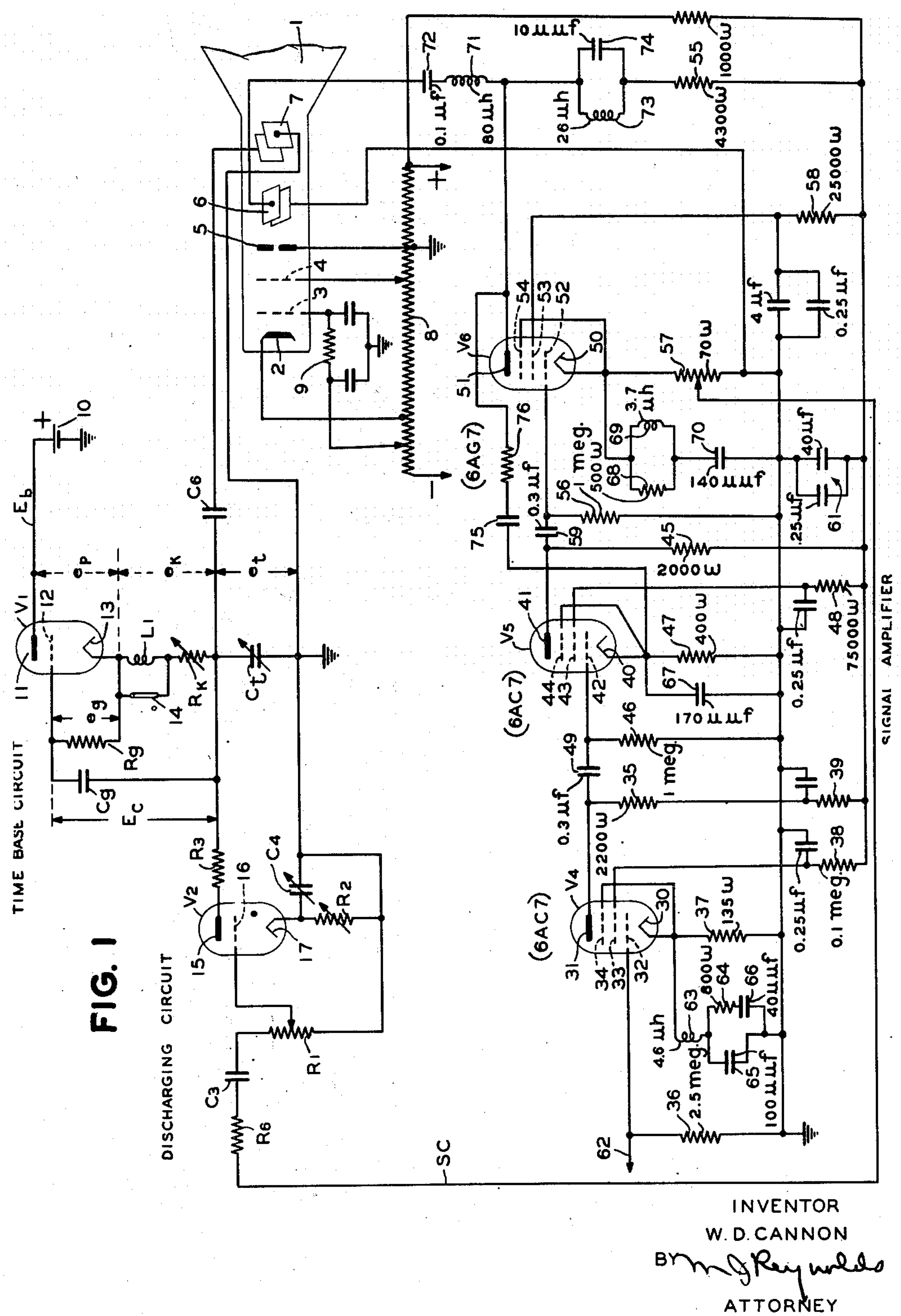
Fig. 1 illustrates a complete oscilloscope system embracing a conventional type of oscilloscope tube, a time base system illustrative of the invention, a conventional discharge circuit, and a signal amplifier possessing certain of the special characteristics of the invention.

In Fig. 1 the charging circuit for the condenser $C_t$ provides a substantially constant flow of current to the condenser under control of the variable resistor $R_k$. That this charging current is substantially constant may be proved by computing the value of the current at a few points in the charging cycle. An expression for the charging current may be derived as follows:

In the condenser charging circuit of Fig. 1, $$E_b = e_p + e_k + e_t \qquad (2)$$

where, $E_b$ = the total applied voltage.

$e_p$, $e_k$, and $e_t$ are voltages across the elements as indicated in the figure at any instant of the charging cycle.

If it be assumed for the time being that the current is substantially constant for a given value of $R_k$, the plate voltage $e_p$ can be represented approximately by the equation $$e_p = Ki_p - \mu e_g \qquad (3)$$

where, K is the plate impedance and $\mu$ is the amplification constant of the tube, both derived from the $E_p$, $I_p$, $E_g$ family of curves for the particular tube and approximate current being considered.

This expression is derived from Equation 49, page 394 of the Principles of Electrical Engineering Series, Applied Electronics; prepared by Massachusetts Institute of Technology and published by John Wiley & Sons, New York.

Also, by inspection, $$-e_g = i_pR_k - E_c, \text{ and } e_k = i_pR_k \qquad (4)$$

since $E_c$ remains constant throughout the time base cycle.

Substituting (3) and (4) in (2)

$$E_b=Ki_p+\mu R_k i_p-\mu E_c+R_k i_p+e_t \quad (5)$$

Whence, the charging current in $C_t$ is $$i_p=\frac{E_b-e_t+\mu E_c}{K+(\mu+1)R_k} \quad (6)$$

The constant voltage drop $E_c$ across $C_g$ is fixed by the maximum value of $e_t$ and is taken at the instant the condenser $C_t$ reaches its full charge and starts discharging. At this point in the cycle, the grid tends to become positive and hence by permitting the flow of grid current short-circuits the grid leak $R_g$. $e_g$ therefore drops to zero. Hence, when $e_t=$ the maximum value of $e_t$, $e_g=0$, and $E_c=i_pR_k$.

From (5) above, $$E_b=Ki_p+R_k i_p+e_t\text{ (max.)}$$

and $$E_c=[E_b-e_t(\text{max.})]\frac{R_k}{K+R_k} \quad (7)$$

To compute an example of the charging current, assume $E_b$=400 volts, $e_t$ (max.)=200 volts,
$R_k$=50,000 ohms, $\mu$=30, and K=8,000.
Then from (7), $E_c$=172.5 volts and from (6), $i_p$=3.45 mils for $e_t$=200 volts
3.51 mils for $e_t$=100 volts
3.57 mils for $e_t$= 0 volts The non-linearity in this case is only ±1.7% from the mean value, even when the sweep voltage reaches 50% of the applied voltage. If the value of K and $\mu$ do not correspond exactly to $i_p$ as calculated, other values can be assumed until K and $\mu$ correspond to $i_p$ as expressed by the family of tube data curves.

The performance in regard to linearity can be appreciably improved, particularly for small values of $R_k$, by including an inductance $L_1$ in series with the charging circuit by opening the switch 14. An inductance of appropriate value along with the resistor $R_k$ in series with the charging circuit provides a higher impedance to the variable component of the charging current and hence an enhanced negative feedback which together serve to largely suppress the variable component of the charging current. The value of charging current is controlled by $R_k$ as before. This arrangement including the inductance is advantageous and convenient where the sweep frequency need be varied over narrow ranges only, in which case switching means for varying the inductance is unnecessary.

In operation, assuming that the gas tube $V_2$ is non-conducting and the switch 14 is closed, current flows from the battery 10 through the space path of tube $V_1$ and the resistor $R_k$ to charge the condenser $C_t$. Starting at the point in the cycle when $C_t$ has just been discharged and $e_t$ equals zero, the development of the voltage $e_t$ serves to deflect the cathode ray beam across the screen. Then $e_p$ will have a maximum value and $e_g$ will have an appropriate negative value as determined by the IR drop across $R_k$. A charging current will then flow, whose magnitude may be regulated by adjustment of $R_k$. As $e_t$ increases, the plate voltage $e_p$ decreases, but by virtue of the feedback through the condenser $C_g$ the negative value of the grid voltage $e_g$ will decrease proportionately so that the charging current $i_p$ remains constant. Charging current will continue to flow until the voltage across $C_t$ has reached a specified desired value, in the case of the example previously mentioned, 200 volts. At this instant the gas tube $V_2$ by virtue of the adjustment of its biasing elements $R_2$ and $C_4$ becomes conductive to initiate the discharge of the condenser $C_t$ and hence to return the cathode ray beam to its starting point. The cycle then repeats itself under control of the synchronizing potential.

The charging current is maintained at an unusually constant rate by virtue of the negative feedback through the network comprising the resistor $R_k$, and the condenser $C_g$ and resistor $R_g$ in combination which as previously pointed out should possess a relatively high time constant. Rapid variations in the current are effectively smoothed out by this means. This effect may be furthered by means of the inductance $L_1$ which is located in series with the charging circuit and may be introduced by opening the switch 14, thereby increasing the negative feedback and hence giving an increased linearity.

Figure 2:
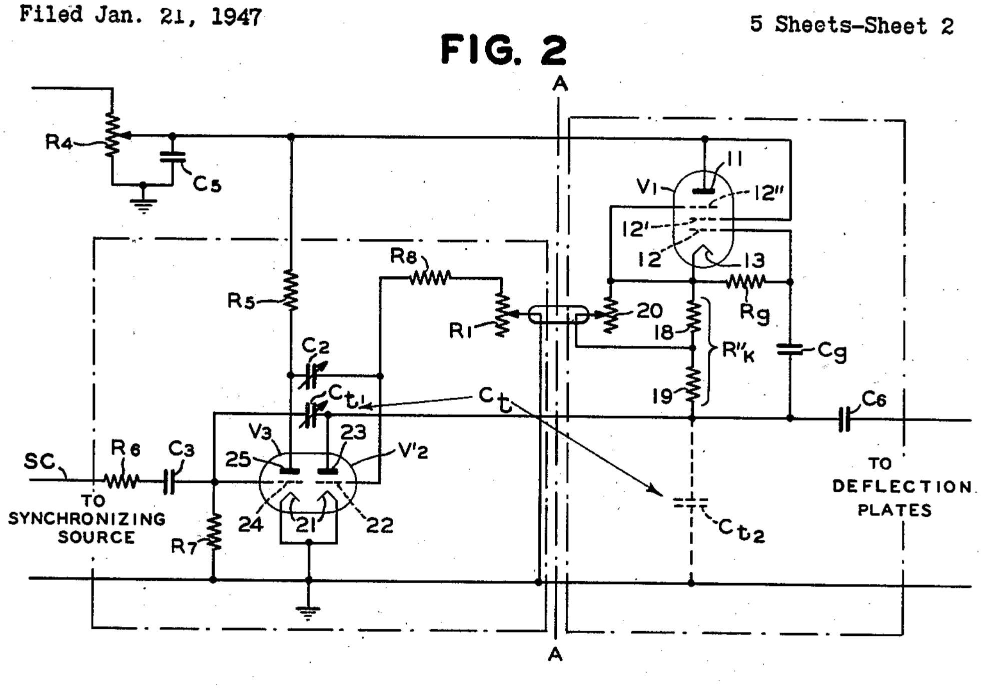
Fig. 2 illustrates a novel combination of time base circuit and discharge circuit.
Figure 3:
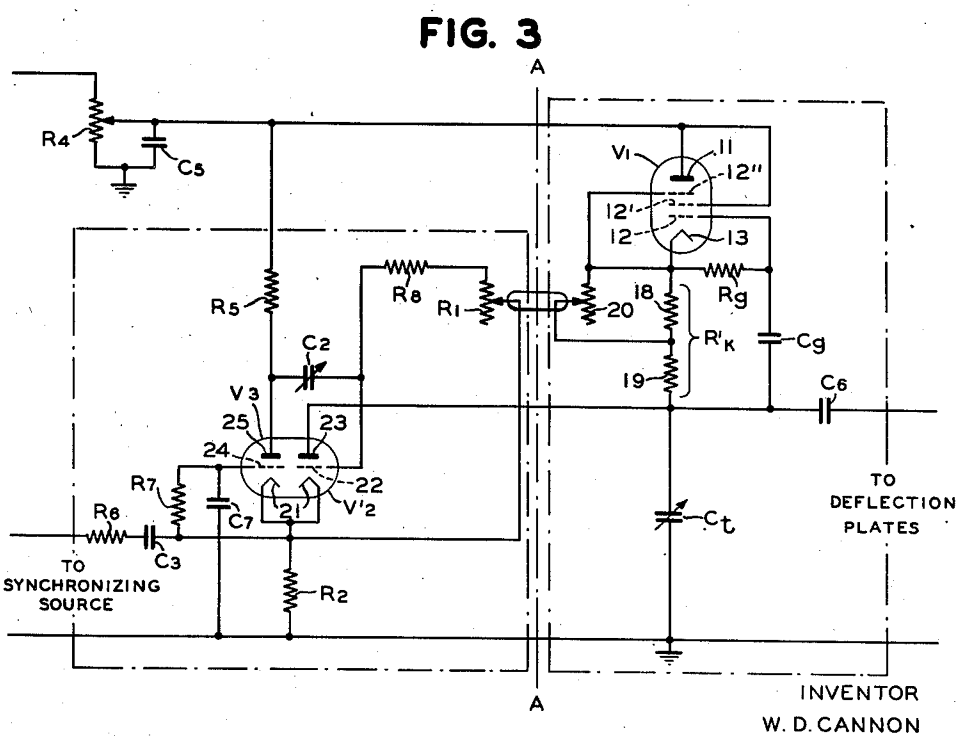
Fig. 3 illustrates a second novel combination of time base circuit and discharge circuit.
Figure 4:
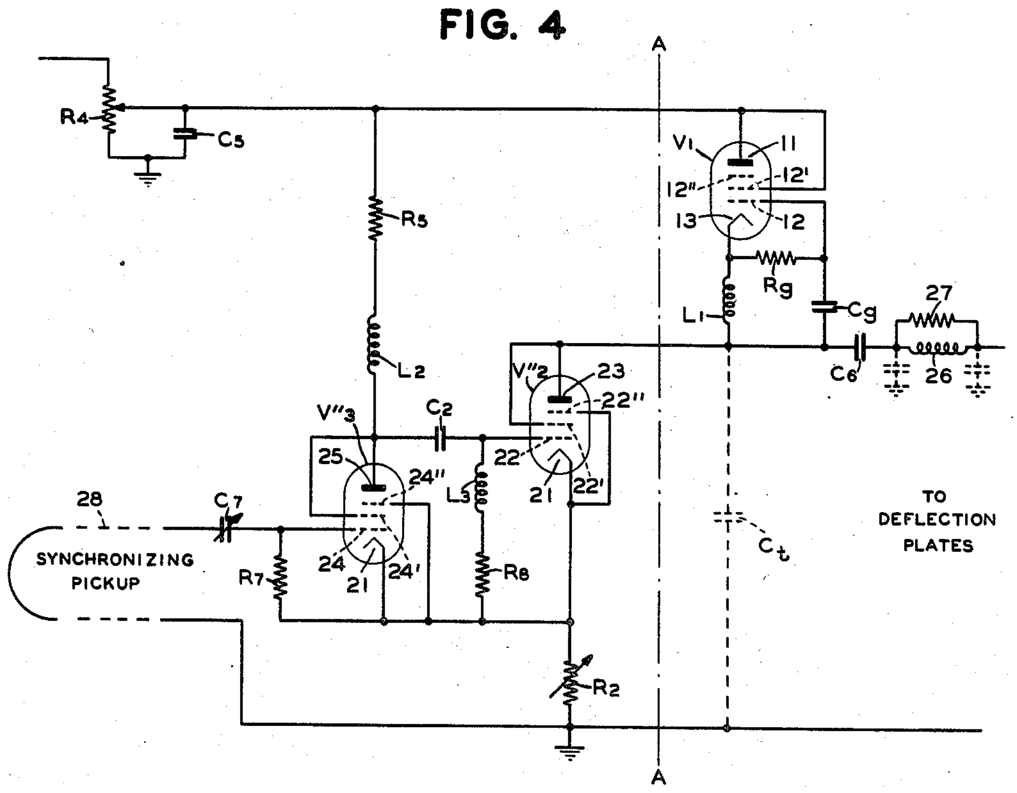
Fig. 4 illustrates a third novel combination of time base circuit and discharge circuit, especially useful for very high frequency applications.

The charging circuit comprising the tube $V_1$ with associated circuit elements is suitable for charging a sweep condenser at a constant rate up to very high frequencies. However, the gas tube discharging circuit illustrated in Fig. 1, because of its deionization rate, becomes unsatisfactory at repetition rates in excess of about 30,000 cycles. In the next adjacent range of frequencies, certain types of multi-vibrator circuits employing hard tubes are satisfactory. Figs. 2, 3 and 4 illustrate three classes of multivibrator discharging circuits, on the left hand side of the lines A—A, operating in cooperation with a constant current charging circuit located on the right hand side of the lines A—A. In these figures elements homologous with the elements of Fig. 1 are designated by like symbols. In Fig. 2 a charging circuit analogous to that of Fig. 1 is illustrated but instead of the triode tube a triode-connected pentode tube is employed and the resistance $R''_k$, to permit use of standard parts and for convenience of adjustment, is divided into three parts. In addition to anode 11, control grid 12 and cathode 13, the tube $V_1$ contains screen grid 12′ and suppressor grid 12″. The resistance $R''_k$, as shown, includes the fixed elements 18 and 19 and the potentiometer 20. The sweep condenser $C_t$ now comprises primarily the condenser $C_{t1}$ associated with the discharging circuit but in addition includes the stray wiring capacities indicated by the condenser $C_{t2}$ shown in dotted lines. Remaining elements of the charging circuit are identical with the analogous elements of Fig. 1.

The discharge function in Fig. 2 is provided by the multi-vibrator circuit comprising the tubes $V'_2$ and $V_3$ which may for convenience be enclosed in a common envelope as indicated. Tube $V'_2$ contains the control grid 22, anode 23 and the cathode 21 which may also be common to tube $V_3$. Tube $V_3$ contains the control grid 24 and anode 25. The two tubes $V'_2$ and $V_3$ are alternately conductive so that the sweep condenser $C_t$ may be charged while tube $V'_2$ is nonconductive and may be discharged when this tube becomes conductive. The second tube serves primarily to cause the tube $V'_2$ to alternate between the non-conducting and conducting conditions. Anode potential is supplied to anode 23 of tube $V'_2$ via the constant current charging tube $V_1$ from the potential source comprising the potentiometer $R_4$ and condenser $C_5$. Potential to the anode 25 of tube $V_3$ is supplied from the same source via the resistor $R_5$. The anode of tube $V'_2$ is coupled to the grid of tube $V_3$ by the sweep condenser $C_t$ while the coupling in the reverse direction between the two tubes is provided by the condenser $C_2$. A grid leak resistance $R_7$ is provided for tube $V_3$. This resistance must be of relatively low value since it is included in series with the sweep condenser $C_{t1}$. The grid leak resistance for the tube $V'_2$ includes the resistor $R_8$ and the potentiometer $R_1$ which is ganged for operation in unison with the variable portion 20 of the charging current regulating resistance $R'_k$.

Operation of multi-vibrator circuits are well understood by those skilled in the art. It should suffice in the present case to point out the principal actions in the cooperative functioning of the tubes $V'_2$ and $V_3$, along with the charging current tube $V_1$, which provide an essentially linear forward trace for the cathode ray beam followed by a rapid return trace. Operation of this circuit organization is essentially as follows. Consider the instant in the cycle when condenser $C_{t1}$ has just been discharged and begins to receive a positive charge through tube $V_1$. At this instant tube $V_3$ is conducting but tube $V'_2$ is non-conducting due to a negative charge on condenser $C_2$ remaining from the previous cycle. A constant current now flows through tube $V_1$ to charge condenser $C_{t1}$ at a uniform rate to accomplish the deflection of the cathode ray beam across the screen. At the same time the negative charge on condenser $C_2$ is leaking off via the resistances $R_1$ and $R_8$ and the space path of the tube $V_3$ until, at the end of the deflection, when condenser $C_{t1}$ has attained its maximum voltage the grid of tube $V'_2$ becomes positive and the tube starts to conduct. At this instant a negative potential is passed via condenser $C_{t1}$ to the grid of tube $V_3$ to cause it to become non-conducting and this action in turn sends a positive charge through condenser $C_2$ to the grid of tube $V'_2$. These latter actions are cumulative in driving the grid of tube $V'_2$ positive at a very rapid rate to permit current to flow through this tube to discharge $C_{t1}$ and thus return the cathode ray beam to the starting point. As current ceases to flow in condenser $C_{t1}$, tube $V_3$ becomes conducting at the same cumulative rate to again charge $C_2$ negatively and interrupt the current flow through the tube $V'_2$. The cycle now repeats itself to start a second deflection of the cathode ray beam.

Synchronization of the applied signal may be accomplished by connecting the grid 24 of tube $V_3$ to a suitable point in the signal circuit via the isolating elements $R_6$ and $C_3$ and conductor SC, as in Fig. 1.

The upper frequency limit for which the circuit of Fig. 2 may be employed is determined by the minimum capacitance of condenser $C_{t1}$ but proper functioning of the multi-vibrator device places the minimum value for this condenser at approximately 5 $\mu\mu$f. The repetition rate is controlled by condenser $C_{t1}$ and $C_2$ in combination which preferably are ganged to a common control. Condensers for this service are usually of fixed types controlled by multi-point switches so that the capacity steps are inconveniently large. For the intervals between steps the velocity of the forward trace may be controlled by the tapered double potentiometer containing resistances $R_1$ and 20. It is evident that the potentiometer 20 controls the charging rate of condenser $C_{t1}$ while the potentiometer $R_1$ controls the discharge rate of condenser $C_2$.

The repetition rate of the time base circuit of Fig. 2 is only slightly affected by the D. C. supply voltage. Hence a convenient method of controlling the beam velocity and the length of the sweep on the screen is supplied by adjusting the D. C. plate voltage by means of the potentiometer $R_4$. This method is particularly serviceable when no amplifier is used in connection with the time base. A further advantage of this independence of the supply voltage lies in improved steadiness of the screen pattern and greater stability of synchronization even for large ratios of signal frequency to repetition rate.

Synchronization of the time base with the signal under observation may be accomplished by injection of the synchronizing voltage into the input circuit of tube $V_3$ in any convenient manner. Only an exceedingly small amount of energy is required. In fact, actual connection to the vertical deflecting source or amplifier is usually unnecessary as sufficient energy to lock the time base securely into synchronism for long periods of time is picked up when the synchronizing lead is placed in proximity to the vertical deflecting source or amplifier. When a vertical deflection amplifier is used, the method shown in Fig. 1 of obtaining the synchronizing voltage by means of the voltage drop across a small resistance or impedance, such as 57, located in the cathode circuit of the last stage is satisfactory. In this way the synchronizing control potentiometer can be so arranged as to have negligible effect on the amplifier characteristics even when the amplifier is designed for the highest frequency.

The time base circuits herein described produce output voltages of ample magnitude for the deflection of the cathode ray beam in most work. However, if needed, an amplifier of the type shown in Fig. 1 but of smaller gain may be introduced between the time base generator and the deflection plates. In the circuits shown in Figs. 1 and 2 and in the subsequent figures as well, one side of the sweep condenser is grounded. This may require that supplemental centering means for the deflection plates 7 of the oscilloscope tube be added. Such arrangements may be of conventional types well known in the art. Additionally, supplemental amplifiers if provided between the time base generator and the deflection plates may be of the phase inverting type arranged to transfer the sweep impulses from the grounded circuit to the ungrounded or center grounded deflection plates.

The usual precautions necessary in high frequency work in respect to shielding and avoidance of wiring and other stray capacities should be observed in the design and operation of these high frequency time base circuits. Further, best results will be obtained from an oscilloscope tube which has a small spot and is particularly designed for high frequency use. This may involve relatively small physical sizes, short leads and separated terminals. An internal shield for the tube is desirable. To prevent undesirable modulation of the intensity of the beam by the sweep or signal voltages, the filter section 9 is indicated in series with the intensity control grid 3 of the cathode ray tube 1 in Fig. 1. As an additional precaution, sometimes desirable, the intensity and focusing elements 3, 4 and 5, may be by-passed to the cathode or to ground by means of small condensers connected at the tube base pins. These precautions are particularly desirable at the higher frequencies.

As previously noted, the upper frequency limit of the circuit of Fig. 2 is determined by the size of the condenser $C_{t1}$ which while serving as an element of the sweep condenser $C_t$ also performs an essential function in the operation of the multi-vibrator and because of the latter may not be reduced below a certain limit. Fig. 3 overcomes this limitation through the choice of a somewhat different circuit which relieves this condenser of its multi-vibrator function. In this figure a charging circuit identical with that of Fig. 2 charges the sweep condenser $C_t$. The discharge function is accomplished by a multi-vibrator circuit which is identical with that of Fig. 2 except that the voltage transfer from the anode-cathode circuit of tube $V'_2$ to the grid 24 of tube $V_3$ is accomplished by means of the self-bias resistor $R_2$ and the condenser $C_7$. The time constant of the condenser $C_7$ and the grid leak $R_7$ should be sufficiently large to prevent variations in grid potential during the period of the longest repetition rate used.

Operation of the circuit of Fig. 3 is essentially similar to that previously outlined in connection with Fig. 2, differing only in certain minor respects. This mode of operation will be described as a series of steps as follows:

For the starting condition:

1. Condenser $C_t$ has just discharged and is ready to receive a positive charge via tube $V_1$.
2. Tube $V'_2$ is non-conducting due to a negative charge remaining on condenser $C_2$ from the previous cycle.
3. Tube $V_3$ is conducting.
4. The grid of tube $V_3$ is at cathode potential.

For the charging condition:

1. A constant current flows through tube $V_1$ to charge condenser $C_t$ to thereby deflect the cathode ray beam.
2. The negative charge on condenser $C_2$ is leaking off via resistors $R_1$ and $R_8$ and the space path of tube $V_3$.

Condition at completion of charge:

1. The negative charge on condenser $C_2$ has leaked off until the grid of tube $V'_2$ retains only a small negative potential.
2. Tube $V'_2$ starts to conduct.
3. Passage of current through tube $V'_2$ and resistor $R_2$ rapidly renders the cathode of tube $V_3$ positive with respect to its grid (in view of condenser $C_7$) so that tube $V_3$ becomes non-conducting.
4. As current through tube $V_3$ diminishes, a heavy positive charge passes through condenser $C_2$ to the grid of tube $V'_2$.
5. Conditions 1 and 4 above cause tube $V'_2$ to become rapidly conductive to discharge condenser $C_t$ via the space path of tube $V'_2$ and the resistor $R_2$.

For the discharging condition:

1. The declining potential across the discharging condenser $C_t$ returns the cathode ray beam to its starting point.
2. As the discharge rate of condenser $C_t$ declines, the IR drop across resistor $R_2$ declines and the cathode of tube $V_3$ becomes less positive with respect to its grid.
3. Current starts to flow through tube $V_3$.
4. A negative charge passes via condenser $C_2$ to the grid of tube $V'_2$ to render that tube nonconductive.
5. Condenser $C_t$ again begins to charge.

Control of the repetition rate and velocity for the circuit of Fig. 3 is the same as in Fig. 2. The capacity of the sweep condenser $C_t$ may be reduced to zero leaving only stray wiring and tube capacities as the minimum. This minimum with the type of tubes indicated may be of the order of 25 $\mu\mu$f. This circuit is somewhat superior to that of Fig. 2 and may be used at frequencies extending to approximately 20 megacycles.

A time base circuit somewhat more specialized in character which may be built for observing frequencies to at least as high as 150 megacycles is illustrated in Fig. 4. This circuit is very similar to that of Fig. 3 and its method of operation is identical, but in order to reach higher frequencies the tubes chosen are types which will carry higher current but without increased capacity to ground, and the circuit elements chosen are almost all of the fixed type in order to avoid the larger ground capacities which accompany the variable types. A limitation of this circuit as shown, therefore, is that the elements may not be adjusted in order to vary the frequency range covered. The system may be built with variable elements for use at other than the highest frequencies.

All three tubes used in this circuit are preferably of the pentode type and selected further for the low capacity of the elements to ground. The tube $V_1$ contains anode 11, control grid 12, cathode 13, and screen grid 12', all connected as shown, but the suppressor grid 12'' in the particular tube shown (6AG7) preferably remains disconnected. The tube $V''_2$ includes anode 23, grid 22 and cathode 21, and also the screen grid 22' and suppressor grid 22'' triode connected as indicated. The tube $V''_3$ is also triode connected and contains the anode 25, cathode 21, control grid 24, screen grid 24' and suppressor grid 24''.

In the charging circuit for the condenser $C_t$ an inductor $L_1$ replaces the resistor $R_k$. An inductor $L_2$ is added in series with the battery supply circuit of tube $V''_3$ and an inductor $L_3$ is added in the grid leak circuit of tube $V''_2$. These inductances have been found to contribute appreciably to linearity of both the forward and return traces. In the operation of this circuit the return trace is sufficiently linear that it may be satisfactorily used for viewing purposes and, because of its high velocity, especially high frequencies may be delineated. Both traces of the sweep circuit may be used to provide simultaneously on the screen a long section covering a number of cycles of signal during the forward trace together with a spread out section covering a smaller number of cycles of signal during the more rapid return trace. Velocity ratios of 1 to 3 are convenient for this purpose. If desired, either trace may be blanked out by means of blanking out circuits well known to those skilled in this art, thus permitting observation of a single trace.

As in the case of Fig. 3, the condenser $C_t$ may be reduced so as to provide a minimum capacity made up solely of the capacity of tube $V''_2$ together with the capacity of the wiring and oscilloscope plates. For the same reason the condenser $C_g$ should be maintained as small as possible. A filter circuit comprising the inductor 26 shunted by the resistor 27 in conjunction with stray wiring capacities as indicated is desirable in order to prevent signal or other frequencies picked up at the oscilloscope tube from reacting on the time base circuit.

Velocities corresponding to voltage variations of 7,000 volts per microsecond are readily obtainable with the ciruit of Fig. 4. Voltage variations at least as high as 9,000 volts per microsecond can be obtained for short periods by increasing the plate voltage and at the same time making appropriate adjustments in $R_5$ and $L_2$. Depending upon the type of oscilloscope tube and the accelerating voltage used, this latter figure corresponds to a velocity approaching 1,500 miles per second for the cathode ray beam across the oscilloscope screen. For the higher velocities, care must be taken to reduce the wiring and shielding capacitances to a minimum.

A low impedance input circuit is desirable for the tube $V''_3$. Sufficient voltage for synchronizing purposes may be obtained by merely bringing the input loop circuit 28 into the vicinity of the signal circuit. Regulation of the time base circuit over a limited frequency range may be accomplished by variation of the resistor $R_2$ and the condenser $C_7$. As previously noted, these variable elements lie at ground potential so that their presence does not introduce shunting capacity nor does the handling introduce disturbing variations in frequency.

The values of the various elements used in the time base circuits of Figs. 1 to 4 are dependent upon the range of frequency under observation. However, in order that adequate information may be conveyed for the practice of the invention, suggested values for each of the figures are specified in the following table of preferred values. It is understood that all of these values are subject to variation and that substitutions may be made in the type of vacuum tubes.

employ ratios of signal frequency to repetition rate of the order of several hundred, or by using high velocities at low repetition rates very short transients may be spread out as much as desired. It is possible also to adjust the sweep frequency to a rate much higher than the signal frequency. This feature has particular utility in the viewing of very short but slowly periodic transients. Hence the transient itself may be well spread out on the screen but the intervening idle period excluded. All of the foregoing may be accomplished while using either the forward or return traces or both, and with complete absence of instability or flicker.

Figure 7:
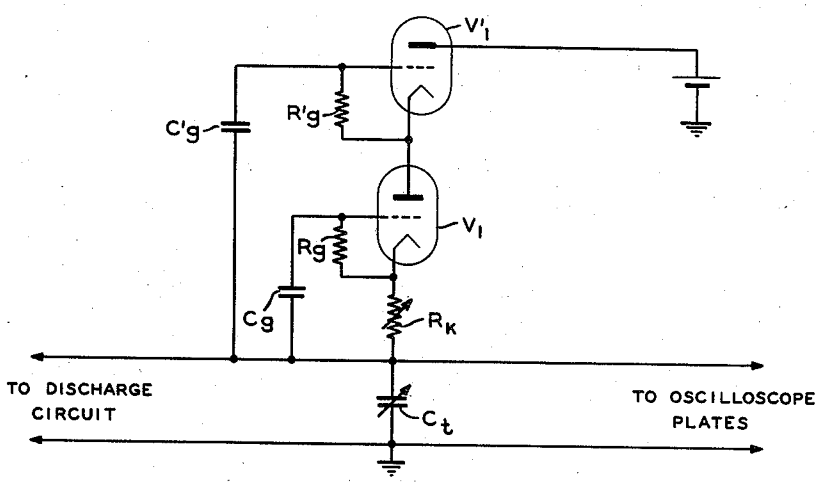
Fig. 7 represents a further improvement in time base circuits designed to produce exceptional linearity in the charging rate.

The single tube charging circuits for the time base systems of Figs. 1 to 4 provide sufficient linearity for all ordinary oscilloscopic work. However, when a greater degree of linearity is needed for oscilloscopic use or for any other constant current application, the linearity may be further improved by the introduction of a second tube $V'_1$ in series with the tube $V_1$ of Figs. 1–4. This portion of the circuit will now be as indicated in Fig. 7. The second tube is provided with resistor $R'_g$ and condenser $C'_g$ corresponding to the like elements $R_g$ and $C_g$ of the first tube. The cathode impedance $R_k$ is common to both tubes and, as before, may include inductance. I have discovered that the presence of the second tube will compound the stabilizing negative feedback effect of the first tube, in fact, it can be proved that for the same $R_k$ the nonlinearity can be reduced by a factor of $\mu+1$ if a

| | Fig. 1 | Fig. 2 | Fig. 3 | Fig. 4 |
|---|---|---|---|---|
| $C_g$ | 0.05 μf | .05 μf | .05 μf | 3–20 μμf. |
| $C_1$ | | Variable | | |
| $C_2$ | | do | Variable | 140 μμf. |
| $C_3$ | .1 | .1 | .1 | |
| $C_4$ | Variable | | | |
| $C_5$ | | 20 μf | 20 μf | 20 μf. |
| $C_6$ | .1 μf | .1 μf | .1 μf | .005 μf. |
| $C_7$ | | | .05 μf | 100 μμf. |
| $L_1$ | Variable | Variable | Variable | 2.5 mh. |
| $L_2$ | | | | 2.5 mh. |
| $L_3$ | | | | 40 mh. |
| $R_g$ | 1 meg | 1 meg | 1 meg | .5 meg. |
| $R_k$ | Variable | | | |
| $R'_k$: | | | | |
| 18 | | .5 meg | .5 meg | |
| 19 | | 15,000 ohms | 15,000 ohms | |
| 20 | | 0–.5 meg | 0–.5 meg | |
| $R_1$ | .25 meg | 0–.5 meg | 0–.5 meg | .5 meg. |
| $R_2$ | | | 500 ohms | 100–200 ohms. |
| $R_3$ | 200 | | | |
| $R_4$ | | 50,000 ohms | 50,000 ohms | 50,000 ohms. |
| $R_5$ | | 30,000 ohms | 30,000 ohms | 7,500 ohms. |
| $R_6$ | >2,000 ohms | >2,000 ohms | >2,000 ohms | |
| $R_7$ | | 500 ohms | 1 meg | .5 meg. |
| $R_8$ | | 25,000 ohms | 25,000 ohms | 5,000 ohms. |
| $V_1$ | 6AB7 | 6AB7 | 6AB7 | 6AG7. |
| $V_2$, $V'_2$, $V''_2$ | 885 | }6F8-G | 6F8-G | 6AG7. |
| $V_3$, $V''_3$ | | | | |

Figure 5:
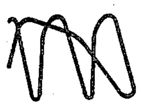
Figs. 5 and 6 illustrate the types of traces obtained on the oscilloscope screen at different frequencies when using the time base circuits of the invention.
Figure 6:

To illustrate the order of linearity which may be obtained with the time base circuits previously described when operating at high frequencies, the oscillograms of Figs. 5 and 6 have been included. Fig. 5 represents a distorted wave at a frequency of 40 megacycles. As will be noted, three cycles of the wave are delineated by the forward trace for each cycle delineated by the more rapid return trace. Fig. 6 illustrates the forward and return traces of a sine wave at 125 megacycles.

A remarkable feature of these time base circuits is their stability, freedom from disturbing variations and the firmness or tenacity of synchronizm of the sweep function with the applied signal. This property greatly augments the utility of the device, e. g. it is readily possible to second identical tube is inserted in series with the tube $V_1$ as indicated in Fig. 7.

For use in connection with an oscilloscope at high frequencies amplifiers capable of amplifying very wide frequency bands with negligible distortion are necessary in connection with the signal deflection plates and less frequently also in connection with the horizontal deflection plates. To meet these requirements an amplifier has been devised which possesses substantially constant amplification and linear phase shift over a band of frequencies having a width of seven megacycles or greater. In this specification attention will be given particularly to an amplifier of this class designed to amplify a band of frequencies ranging from the neighborhood of one cycle up to seven megacycles. However, by the same methods the amplifier may be arranged to accommodate a band of frequencies of like width located at frequencies very much higher in the spectrum.

Figure 8:
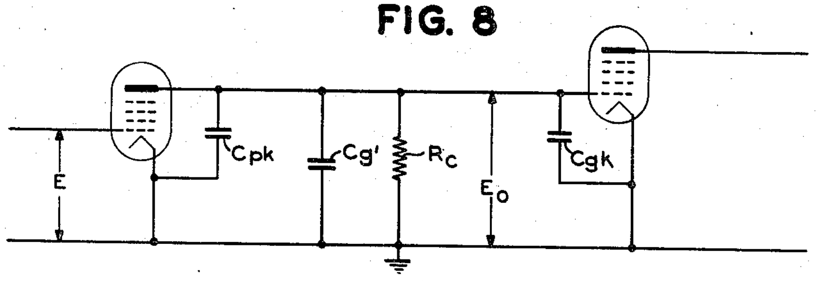
Figs. 8, 9 and 10 are simplified figures provided for use in connection with the explanation of the theory of the signal amplifier illustrated in Fig. 1.

In order to explain the particular advantages of the amplifier of this invention it will be necessary to examine briefly present practices in the design of broad band amplifiers for operation at high frequencies. Fig. 8 shows the equivalent circuit of a resistance-capacitance coupled amplifier stage at high frequencies where the element and wiring capacitances become important. Equivalent total capacitances to ground include three components; $C_{g'}$, wiring to ground; $C_{pk}$, plate to cathode; and $C_{gk}$, grid to cathode. The resistor $R_c$ represents the necessary interstage coupling or load impedance. At high frequencies the coupling impedance as a whole degenerates into a composite shunting capacitance whose impedance diminishes with increasing frequency, with consequent falling off in voltage output to the succeeding stage. With the high frequency output thus limited it is customary in order to obtain a flat frequency characteristic, to lower the low frequency output voltage to the same degree by reducing the coupling resistance to a value which approximates the shunting reactance at the upper frequency cut off. With ordinary pentode tubes this coupling impedance in a wide band amplifier will be of the order of 1000 ohms, and with the plate current relatively fixed it is seen that a limit is quickly reached to the available output voltage for the stage. Hence in wide band amplifiers it is necessary to accept low voltage outputs and low gains per stage. This loss in gain may be recovered to some degree by the introduction of inductances which tune to the capacities so as to present a more favorable coupling impedance. However, such inductances occupy positions in the circuit having high impedance with respect to ground and as they contribute further shunting capacity they quickly become self-limiting in their benefits. An amplifier designed according to these principles is disclosed in Patent No. 2,370,399.

The present amplifier greatly improves upon the former practice in that it actually achieves an effective reduction of the tube element capacities to ground, rather than a compensation, so that the high frequency coupling impedance remains large and the low frequency coupling impedance may accordingly be raised to a high value. This improvement is accomplished through the introduction of impedance networks in the cathode circuits of the tubes where they are essentially at ground potential and do not shunt the signal circuits. These networks produce cathode feedback to cause a considerable redistribution of the circuit values.

Figure 9:
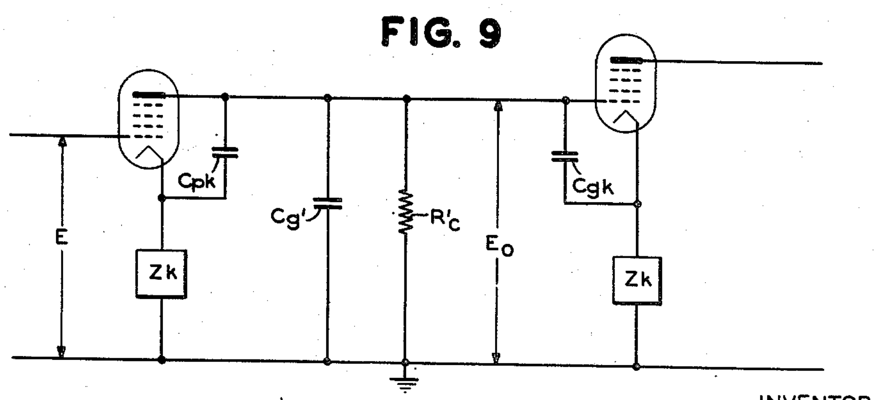

With cathode feedback, the corresponding equivalent circuit is shown in Fig. 9, the three capacitances now being separated by the respective cathode impedances $Z_k$, and $R_c$ being increased to a new value $R'_c$. Actually each of these new capacitances is an equivalent capacitance evaluated for the particular tube conditions, and include the effects of space charge and feed back through the inter-element capacitances. With the shunting capacities thus reduced the coupling resistance can be increased until it is again equal to the shunting reactance (accompanied if necessary by an increase in the plate voltage supply so as to maintain rated plate current) with an accompanying increase in available output voltage. Hence the output voltage for the stage will be uniformly increased for the entire band. In the present case $R'_c$ is about twice as large as $R_c$ to permit an approximate doubling of the output voltage. This increase in output, however, does not necessarily result in any appreciable increase in gain because any improvement in this direction will have been absorbed by the negative feedback. Advantages of the amplifier are, rather, that high voltage outputs may be obtained uniform over a very wide band of frequencies, provided an adequate input voltage is applied. For bands of lesser width, larger voltages are vailable inasmuch as the product of band width and output voltage is a design constant for a particular amplifier tube. Other significant advantages are that since the correcting networks are at ground potential and do not shunt the signal circuits, it is possible to use more complex networks, as desired, to meet any requirement. For example, the networks may be arranged to be adjustable for the separate correction of amplitude and phase and to correct for both high and low or for intermediate frequencies. Further, as is well known, the negative feedback which accompanies the use of the cathode networks increases the stability of the amplifier and reduces the tendency to transient oscillation in the networks.

The vertical deflection amplifier shown with the cathode ray oscilloscope in Fig. 1 possesses an exceptionally flat response from one cycle to about seven megacycles, and good transient response. These two requirements are somewhat incompatible and usually cannot be met at the same time without sacrifice of some band width. The best transient response requires that the frequency response fall off gradually at the upper end of the frequency band, whereas an amplifier which has a flat frequency response to the highest possible frequency and then falls off rapidly, will have an inferior transient response. Curves showing the relation between frequency response and transient response are given in a paper, "Picture Transmission by Submarine Cable," by J. W. Milnor, A. I. E. E. Transactions, 1941, pp. 105–08, Fig. 3. Although applied to low frequencies, the curves of the paper are equally valid for high frequencies.

The three stage amplifier of Fig. 1 uses negative feedback over the last two stages and individual feedback in each of the three stages. In the first stage only individual feedback was necessary since in view of the low signal level, distortion was small. With such a design difficulties are avoided due to instability and in the making of adjustments for various response conditions. The individual feedback for each stage was accomplished by the use of networks in the cathode circuit of each tube which permits the frequency and phase characteristics to be readily controlled at any part of the frequency range by means of simple adjustment of these networks.

Before describing the amplifier in greater detail a discussion of the effect of this type of feedback upon the inter-element capacities will be undertaken.

Referring again to Fig. 8, the effect of each of the capacitances $C_{g'}$, $S_{pk}$, and $C_{gk}$ on the frequency characteristic will be examined separately. The stage gain (complex) for the $C_{g'}$ portion of the total shunting capacity at frequency $f$ is $$\frac{E_0}{E}=\frac{g_m R_c}{1+j\omega R_c C_{g'}} \quad (8)$$

where $g_m$ is the mutual conductance for the tube and $\omega=2\pi f$.

With cathode feedback, Fig. 9, the corresponding stage gain is $$\frac{E_0}{E}=\frac{\dfrac{g_mR'_c}{1+j\omega R'_cC_{g'}}}{1+g_mZ_k} \qquad (9)$$

Figure 10:
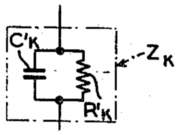

If $Z_k$ is assumed to be a resistor $R'_k$ and a condenser $C'_k$ in parallel, as in Fig. 10.

$$\frac{E_0}{E}=\frac{\dfrac{g_mR'_c}{1+j\omega R'_cC_{g'}}}{1+\dfrac{g_mR'_k}{1+j\omega R'_kC'_k}} \qquad (10)$$

If we make $$C'_k=\frac{R'_cC_{g'}}{R'_k} \qquad (11)$$

$$\frac{E_0}{E}=\frac{g_mR'_c}{1+g_mR'_k+j\omega R'_cC_{g'}}$$

$$=\frac{g_mR'_c}{1+g_mR'_k}\cdot\frac{1}{1+\dfrac{j\omega R'_cC_{g'}}{1+g_mR'_k}} \qquad (12)$$

and letting $$R'_c=(1+g_mR'_k)R_c \qquad (13)$$

then $$\frac{E_0}{E}=\frac{g_mR_c}{1+j\omega R_cC_{g'}} \qquad (14)$$

Equation 14 is the same as Equation 8; hence under the conditions of Equations 11 and 13 the gain is identical for no feedback and for cathode feedback.

Similarly, for the capacitance $C_{pk}$ in Fig. 8, $$\frac{E_0}{E}=\frac{g_mR_c}{1+j\omega R_cC_{pk}} \qquad (15)$$

and in Fig. 9, the corresponding gain is, $$\frac{E_0}{E}=\frac{g_mR'_c}{1+Z_k(g_m+j\omega C_{pk})+j\omega R'_cC_{pk}} \qquad (16)$$

When $Z_k$ is a condenser and resistor in parallel as before, $$\frac{E_0}{E}=\frac{g_mR'_c}{1+\dfrac{g_mR'_k+j\omega R'_kC_{pk}}{1+j\omega R'_kC'_k}+j\omega R'_cC_{pk}} \qquad (17)$$

If we make $$C'_k=\frac{C_{pk}}{g_mR'_k} \qquad (18)$$

then $$\frac{E_0}{E}=\frac{g_mR'_c}{1+g_mR'_k}\cdot\frac{1}{1+\dfrac{j\omega R'_cC_{pk}}{1+g_mR'_k}} \qquad (19)$$

and hence also reduces to $$\frac{E_0}{E}=\frac{g_mR_c}{1+j\omega R_cC_{g'}} \qquad (20)$$

when $$R'_c=(1+g_mR'_k)R_c \qquad (13)$$

For the capacitance $C_{gk}$, by a similar method it can be shown that the gains of Figs. 8 and 9 are again identical when we make $$C'_k=\frac{C_{gk}}{g_mR'_k} \qquad (21)$$

and $$R'_c=(1+g_mR'_k)R_c \qquad (13)$$

From the foregoing it is evident that in the amplifier of Fig. 8 each of the shunting capacitances $C_{pk}$, $C_{g'}$ and $C_{gk}$ has a share in reducing the gain of the stage which in theory may be treated more or less separately. It is further evident that, under specified conditions, negative feedback may be introduced into the amplifier without loss in gain. These conditions are: (a) The elements $C'_k$ and $R'_k$ of the cathode networks must bear the relationship to $C_{pk}$, $C_{g'}$ and $C_{gk}$ when considered alone as expressed in Equations 11, 18 and 21, and, (b) the plate resistance $R_c$ of Fig. 8 must be increased to $R'_c$ in Fig. 9 by the factor indicated in Equations 13.

Calculation of $C'_k$ for practical conditions from Equations 11, 18, and 21 give values of capacitance many times larger for Equation 11 than for Equation 18 or 21. Hence the value of $C'_k$ is principally determined by $C_{g'}$. This is because due to the cathode feedback the tube element capacities are in effect reduced and consequently the required capacity in shunt with $R'_k$ to compensate for the effects of $C_{pk}$ and $C_{gk}$ on the frequency and phase characteristics of the stage are rendered much smaller in value than the corresponding capacity required to compensate for $C_{g'}$. Hence the importance of keeping $C_{g'}$, which is made up principally of wiring and stray capacitances, to a minimum is evident. The composite value of $C'_k$, must compromise somewhat from that determined from the individual Equations 11, 18, and 21 along with modification of $R_c$ in accordance with Equation 13, to provide the same gain as without feedback and it is not possible to obtain all of the indicated improvement. However, the final capacity is still quite small in value and so allows considerable opportunity of modifying the frequency and phase characteristics by further modifications in the $Z_k$ networks.

From the foregoing, it can be seen that a network $Z_k$ in the cathode circuit of the various stages has important properties in modifying the frequency and phase characteristics of an amplifier. Increasing or decreasing the composite value of $C'_k$ gives respectively a gradually rising or falling characteristic with frequency.

The networks $Z_k$ can have many forms. They may be simple frequency or phase regulating networks as shown in Fig. 1 or they may be filter sections or transmission lines with or without reflections to modify the frequency and phase characteristics. More complicated networks can be added to $Z_k$ to affect the characteristics in a particular region. The frequency characteristic can be made as flat as desired over the useful range usually by simple adjustments, or the phase characteristics can be readily modified. In making these adjustments in $Z_k$, the network can be made as complicated as one wishes without adding the harmful additional capacitances to $C_{g'}$, $C_{pk}$, or $C_{gk}$ that would result if complex networks were introduced into the plate or grid circuits.

Particular emphasis should again be placed upon the property of the amplifier of Fig. 1 in providing high voltage output for an extremely wide band frequencies. The amplifier of Patent 2,370,399 has already been referred to. The practice of improving the linearity of amplifiers by means of negative feedback is also common, but in the past so far as I am aware this expedient has always been accompanied by a substantial reduction in gain and in voltage output. This is in contrast to the amplifier of Fig. 1 which not only avoids the addition of shunting capacities, but through the use of cathode feedback causes an effective reduction in internal tube capacities to further reduce the losses at the upper frequency end of the range. The principal shunting capacity remaining is that of the inter-stage wiring to ground and the effect of this capacity on the amplifier frequency and phase characteristic, up to the limiting frequency of the amplifier, may be conveniently compensated by design and adjustment of the compensating networks located in the cathode circuit. With the shunting capacities minimized the plate load impedance may be increased to at least twice the value indicated by customary design practice, so that reduction in output caused by the negative feedback can be compensated. By increasing the voltage of the battery supply source this impedance may be still further increased to provide very substantial increases in output while retaining constant attenuation and linear phase shift over the entire frequency band.

In Fig. 1 an amplifier is indicated only in the circuit of the vertical deflection plates. Ordinarily an amplifier is not required in the horizontal deflection plates inasmuch as the time-base circuit itself produces substantial output voltage. However, if an amplifier is required in this circuit it may to advantage be of the type illustrated. This is particularly true in such applications as circular sweeps where the characteristics of both deflection circuits should be identical in respect to both attenuation and phase shift. There are also advantages of economy and simplicity if the amplifier equipment of the oscilloscope is limited to the one type.

A detailed description of the amplifier of Fig. 1 follows: In order to provide substantial gain three stages employing tubes $V_4$, $V_5$ and $V_6$ are illustrated. These tubes may be conveniently of the types 6AC7 for the first two stages and 6AG7 for the output stage. However, other equivalent types of tubes may be substituted if desired. The three tubes possess, respectively, cathodes 30, 40 and 50, anodes 31, 41 and 51, control grids 32, 42 and 52, screen grids 33, 43 and 53, and suppressor grids 34, 44 and 54. Input potentials are supplied to grid 32 of the first stage of the amplifier over conductor 62. The three tubes are provided respectively with plate coupling impedances 35, 45 and 55 and grid resistors 36, 46 and 56. The tubes also are supplied with self-bias resistors 37, 47 and 57, respectively. Decoupling filters 38, 48 and 58 are provided for the screen grid circuits of the three tubes respectively while a similar filter 39 is provided for the plate circuit of the initial stage. As a means of preventing inter-stage feedback either at low or high frequencies a large condenser 61 shunted by a small non-inductive condenser is inserted across the plate voltage supply circuit. Condenser 49 couples the anode of tube $V_4$ to the grid of tube $V_5$ while condenser 59 similarly couples tube $V_5$ to tube $V_6$. Potentials for synchronizing the oscilloscope sweep circuit may be readily tapped to points on the grid-cathode resistor 36 of tube $V_4$, or preferably may be obtained as shown from a cathode resistor such as 57 for tube $V_6$.

Compensating impedances which are preferably adjustable in some degree shunt the self-bias resistors of each of the three tubes to provide selective negative feedback. These impedances may be relatively simple or may consist of complex networks but as illustrated are of relatively simple form, each designed to cover a separate portion of the frequency range handled by the amplifier. The tube $V_4$ impedance network comprises inductor 63, resistor 64 and the condensers 65 and 66. For the intermediate tube $V_5$, condenser 67 only is provided as a cathode network. In the output stage the parallel connected resistor 68 and inductor 69 in series with condenser 70 is provided. A circuit including condenser 75 and resistance 76 connect the anode of tube $V_6$ to the cathode of tube $V_5$ to permit negative feedback over these last two stages. In the output stage of the amplifier, a so-called series peaking network comprising inductor 71 and condenser 72 and a shunt peaking network including inductor 73 and condenser 74 are provided. These networks serve to sustain the upper end of the frequency characteristic of the amplifier.

The plate coupling resistors for each stage are in all cases much larger than would be provided on the basis of the usual design formulae for wide band resistance coupled amplifiers thereby providing substantially increased voltage output for each stage. Likewise, the high impedance output circuit for the final stage serves to provide a large voltage to drive the oscilloscope plates. The peaking networks used in the output stage are provided principally to compensate the input capacitance of the oscilloscope tube since it is not possible to effectively compensate this capacitance by means of the cathode networks. The usual care in minimizing wiring capacities and in isolating the rather large coupling condensers should be followed in the design of this amplifier for high frequencies.

In the figure, no means for adjusting gain has been illustrated. One means for doing this without adding harmful shunting capacities is to adjustably connect the input conductor 62 to the cathode resistor of a preceding cathode follower stage.

The frequency characteristic of the amplifier is illustrated in Fig. 11. It will be noted that the gain is substantially constant from approximately one cycle to 7 megacycles where a gradual downward slope is provided. Irregularities tend to occur at the very lowest frequencies unless substantially perfect regulation is provided in the anode voltage supply.

A frequency response which falls off at the rate shown in Fig. 11 will possess a somewhat inferior transient response. For distortionless amplification of transients somewhat greater slope should be provided. Fig. 15 illustrates a transient response oscillogram when a wave front of approximately .1 microsecond was applied to the input of the amplifier. It will be noted that the wave front is steep and free of oscillations. The central timing wave in the figure has a frequency of 1.05 megacycles.

In Fig. 16 is shown a similar transient response oscillogram when the networks were adjusted so that the frequency characteristic has approximately 2 db amplitude rise at the upper end of the frequency response curve. The oscillations following the wave indicate that both amplitude and phase distortion are present.

In the amplifier illustrated in Fig. 1, numerical values are given for the various elements. It should be understood that these are for a particular case, that is, an amplifier possessing the broad band characteristic illustrated in Fig. 11. Other combinations of elements may produce the same approximate result. The values given, therefore, are merely illustrative and intended only to serve as a guide in the construction of such amplifying devices.

As indicated in the frequency characteristic of Fig. 11, the amplifier of Fig. 1 provides faithful amplification down to a frequency of approximately one cycle. This low frequency fidelity is a consequence of the negative feedback employed, aided further by the choice of values for the decoupling network 39 of the plate circuit of tube $V_4$. Further expedients for improving the low frequency range of this amplifier may readily be introduced. An amplifier of the same general character as that of Fig. 1 is illustrated in Fig. 12 which possesses both high frequency and low frequency compensation. An approach to the method of low frequency compensation will be illustrated in connection with Figs. 13 and 14.

Referring to Fig. 13, a single stage amplifier is schematically shown as a vacuum tube with anode, cathode and control grid elements and having a mutual conductance $g_m$. The circuit elements include a cathode resistor $R''_k$, a grid resistor $R''_g$, a grid condenser C, appropriate anode and grid batteries, and a plate resistor $R''_c$ through which the plate current $I_p$ flows. By the method shown previously, it can be shown that the relationship between output voltage $E_0$ and the input voltage E may be represented by the following expression:

$$\frac{E_0}{E}=\frac{g_m R''_g R''_c}{R''_g\left(1+g_m R''_k+\frac{1}{j\omega C}\right)} \text{ for } R''_g >> R''_k \quad (22)$$

or, expressed in operational form for transient response.

$$\frac{E_0}{E}=\frac{g_m R''_g R''_c}{1+g_m R''_k}\cdot\frac{p}{p+\frac{1}{R''_g C(1+g_m R''_k)}}\bigg| \quad (23)$$

where $p=j\omega$, and $|$ is the Heaviside Operator. Solving, $$\frac{E_0}{E}=\frac{g_m R''_g R''_c}{1+g_m R''_k}\cdot\epsilon^{-\left[\frac{t}{R''_g C(1+g_m R''_k)}\right]} \quad (24)$$

Without feedback, $R''_k=0$, and the transient response becomes $$\frac{E_0}{E}=g_m R''_g R\epsilon^{-\left[\frac{t}{R''_g C}\right]} \quad (25)$$

where R is the appropriate value of plate load resistance corresponding to $R''_k=0$. Hence, when negative feedback is added the time constant $R''_gC$ is increased by the factor $(1+g_mR''_k)$ with a corresponding many fold increase in gain at the very low frequencies where the response is normally deficient. The amplifier characteristic is thus extended linearly to a value nearer to zero frequency. As in the case for high frequency response, the wide band gain can usually be restored to the original before feedback was added by increasing the plate resistor by the factor $$(1+g_mR''_k)$$

That is when $R''_c=(1+g_mR''_k)R$ in the equations above, the gain becomes equal for both cases. If it is desired to omit the grid biasing battery $R''_g$ may be tapped at $R_9$ along $R''_k$ at a point which will avoid the excessive grid bias that occurs when a large value of $R''_k$ is used. The increase in time constant is then $$\frac{1+g_mR''_k}{1+g_mR_9}\cdot R''_gC \quad (26)$$

where $R_9$ is the part of $R''_k$ between the cathode and the tap on $R''_k$. This method of connection is indicated in Fig. 14. If $R''_g$ is returned to ground, it should be noted that there is no increase in the time constant $R''_gC$, due to the introduction of cathode feedback.

To illustrate the incorporation of this method of low frequency compensation into an amplifier such as that disclosed in Fig. 1 which is provided also with high frequency compensation, Fig. 12 has been provided. This amplifier corresponds essentially to the final two stages of the amplifier of Fig. 1 including tubes $V_5$ and $V_6$. Circuit elements bearing like designations in the two figures have the same significance but it should be understood that the numerical values of these elements may differ from those given in Fig. 1. In Fig. 12 the grid resistor 46 of tube $V_5$ connects to a variable tap 46' on the cathode resistor 47 after the manner illustrated in Fig. 14, while the entire resistance is shunted by a high frequency compensating network $N_1$. Similarly, the grid resistor 56 of tube $V_6$ is connected at tap 56' to the cathode resistor 57 which is in turn shunted by the network $N_2$. The cathode resistors 47 and 57 are now of larger value than would be used for considerations of high frequency compensation alone. The large amount of negative feedback which follows tends to reduce the gain per stage over the entire frequency range. However, this is again compensated by increasing the plate circuit resistor 45 and 55 by the factor $(1+g_mR''_k)$ while the plate supply voltage should be increased accordingly. It is apparent, therefore, that the amplifier of Fig. 12 incorporates both high frequency and low frequency compensation to provide an exceptionally wide band width along with a high order of amplification.

While the specific amplifier examples illustrated in Figs. 1 and 12 were designed for the amplification of wide frequency bands extending from near zero frequency up to 7 megacycles or higher, their use is also envisaged for amplifying bands of corresponding width but having boundary frequencies located at very much higher positions in the spectrum. The conversion from a low pass to a band pass amplifier is accomplished principally by changing the character of the cathode networks and the interstate coupling circuits, including the capacitances $C_{g'}$, $C_{pk}$ and $C_{gk}$, from low pass to band pass varieties after the manner familiar to designers of filter and like network structures. In general the band pass design may be obtained from the low pass design by substituting resonant circuits for the coils and anti-resonant circuits for the condensers, all tuned to the center of the desired band. Such amplifiers are serviceable also for many purposes other than the one illustrated, for example, as video amplifiers, and as intermediate amplifiers in micro-wave applications.

Likewise the constant current charging circuit described in connection with oscilloscope time bases has multiple uses in the supply of constant current to circuits of rapidly varying impedance, or in suppressing rapid fluctuations, such as ripples, in a supply source.

It should now be apparent that this invention provides the two essential and cooperating elements for the operation of cathode ray oscilloscopes in the observation of both periodic and transient phenomena requiring faithful amplification over very wide frequency bands and oscilloscopic delineation at extremely high beam velocities. By means of amplifiers designed according to the invention a very wide variety of electrical phenomena may be applied at high voltage and without distortion to the signal deflection plates of an oscilloscope. In combination therewith the unique time base circuits, particularly those of Figs. 3 and 4, provide ample beam velocity for the detailed delineation of these phenomena on the oscilloscope screen.

While the invention has been disclosed in particular embodiments, these specific illustrations are for the purpose of conveying adequate information for the practice of the invention. It should be understood that the invention may be practiced in divergent methods and is not at all to be restricted to the specific embodiments illustrated, but is to be limited only by the scope of the claims.

What is claimed is:

1. In an oscilloscope system, a sweep condenser, a circuit for cyclically charging said condenser, and means for rendering constant the charging rate of said condenser comprising a negative feedback circuit having a time constant longer than the cyclic period.

2. In an oscilloscope system, a sweep condenser, a circuit for cyclically charging said condenser, means for rendering constant the charging rate of said condenser comprising a negative feedback circuit having a time constant longer than the cyclic period, and means for discharging said condenser at a constant rate.

3. A condenser, means for supplying a definite charge to said condenser, and means for rendering constant the charging rate of said condenser comprising a negative feedback circuit having a time constant longer than the charging period.

4. In an oscilloscope system, a sweep condenser, a charging circuit for charging said condenser to a predetermined voltage, and means for rendering constant the voltage rise across said condenser during charge comprising a negative feedback circuit having a time constant longer than the charging period.

5. A system for providing a constant flow of direct current to a load circuit, which comprises a space discharge device including an anode, cathode, and control grid, a source of current in series with said load and the space path of said space discharge device, an impedance connected in series with said load and adjacent to said cathode, and negative feedback means for maintaining constancy of said current flow including a resistor connecting said grid and cathode and a condenser connected in shunt to both said resistor and impedance.

6. A system for providing a constant flow of direct current to a rapidly varying load comprising a space discharge device including at least an anode, cathode, and control grid, a source of current in series with said load and the space path of said space discharge device, an inductance connected in series with said load and adjacent to said cathode, and negative feedback means for maintaining constancy of said current flow including a resistor connecting said grid and cathode and a condenser connected in shunt to both said resistor and impedance.

7. A system for providing a constant flow of direct current from a variable source comprising a space discharge device including an anode, cathode, and control grid having the space path of said space discharge device in series with said source, an impedance connected in series with said load and adjacent to said cathode, and negative feedback means for maintaining constancy of said current flow including a resistor connecting said grid and cathode and a condenser connected in shunt to both said resistor and impedance.

8. A system for providing a constant flow of direct current to a rapidly varying load comprising a space discharge device including an anode, cathode, and control grid, a source of current in series with said load and the space path of said space discharge device, an impedance connected in series with said load and adjacent to said cathode, and negative feedback means for maintaining constancy of said current flow including a resistor connecting said grid and cathode and a condenser shunting both said resistor and impedance, the time constant of said resistor and condenser in combination exceeding the period of the average of said load variations.

9. In a sweep circuit for the deflection plates of a cathode ray oscilloscope having a sweep condenser connected in parallel to said plates and a charging circuit for said sweep condenser adapted to provide a rising voltage during charge; the improvements which comprises means for rendering constant the rate of rise of said voltage including a constant current circuit in series with said condenser, said constant current circuit comprising in series connection a source of direct current, a vacuum tube having at least an anode, a cathode, and a control grid, an impedance connected in circuit adjacent to said cathode, a grid resistor connecting said grid to said cathode, and a grid condenser connected in shunt to said grid resistor and said impedance, said grid resistor and grid condenser having a time constant longer than the period of charge of said sweep condenser, and a discharging circuit for said condenser.

10. In a sweep circuit for the deflection plates of a cathode ray oscilloscope having a sweep condenser connected in parallel to said plates and a charging circuit for said sweep condenser providing a rising voltage during the charging cycle; the improvement which comprises means for rendering constant the rate of rise of said voltage including a constant current circuit in series with said condenser which comprises in series connection a source of direct current, a vacuum tube having at least an anode, a cathode, and a control grid, an impedance connected in circuit adjacent to said cathode, a grid resistor connecting said grid to said cathode, and a grid condenser connected in shunt to said grid resistor and said impedance, said grid resistor and grid condenser having a time constant longer than the period of charge of said condenser, and discharging means for said condenser including a multivibrator device comprising two vacuum tubes each having anodes and control grids, condensers interconnecting respectively the anode of each tube to the control grid of the other, one of said condensers serving as said sweep condenser.

11. In a sweep circuit for the deflection plates of a cathode ray oscilloscope having a sweep condenser connected in parallel to said plates and a circuit for cyclically charging said sweep condenser; the improvement which comprises means for rendering constant the rate of rise of voltage across said condenser during charge including a constant current circuit in series with said condenser which comprises in series connection a source of direct current, a vacuum tube having at least an anode, a cathode, and a control grid, an impedance connected in circuit adjacent to said cathode, a grid resistor connecting said grid to said cathode, a grid condenser connected in shunt to said grid resistor and said impedance, and a discharging circuit for said sweep condenser including at least one space discharge device also having an anode, a cathode, and a control grid, an impedance connected in circuit adjacent to said last-mentioned cathode, a grid resistor connecting said last-mentioned grid to said last mentioned cathode, and a grid condenser connected in shunt to said grid resistor and said impedance, said grid resistors and grid condensers for each tube respectively having time constants longer than the period of the phenomena under observation on the oscilloscope screen.

12. In a sweep circuit for the deflection plates of a cathode ray oscilloscope having a sweep condenser connected in parallel to said plates and a charging circuit for said sweep condenser adapted to provide a voltage rising to a maximum at the end of charge; the improvements which comprises means for rendering constant the rate of rise of said voltage including a constant current circuit in series with said condenser which comprises in series connection a source of direct current, a vacuum tube having at least an anode, a cathode, and a control grid, an impedance connected in circuit adjacent to said cathode, a grid resistor connecting said grid to said cathode, and a grid condenser connected in shunt to said grid resistor and said impedance, said grid resistor and grid condenser having a time constant longer than the period of the phenomena under observation on the oscilloscope screen, said maximum charge voltage being at least 50 per cent of the voltage of the source.

13. In a sweep circuit for the horizontal deflection plates of a cathode ray oscilloscope having a sweep condenser connected in parallel to said plates and a charging circuit for said sweep condenser adapted to provide a rising deflection voltage; the improvements which comprises means for rendering constant the rate of rise of said voltage including a constant current circuit in series with said condenser which comprises a source of direct current having a voltage not larger than twice the final deflection voltage.

14. In an oscilloscope system, a sweep condenser, a circuit for cyclically charging said sweep condenser, means for rendering constant the charging rate of said sweep condenser comprising a negative feedback circuit having a time constant longer than the cyclic period, and means for discharging said sweep condenser comprising a pair of alternately conductive vacuum tubes, each tube including at least an anode and control grid, condensers joining the anode of each tube to the grid of the other, respectively, one of said condensers and said sweep condenser being common.

15. In an oscilloscope system, a sweep condenser, a circuit for cyclically charging said sweep condenser, means for rendering constant the charging rate of said sweep condenser comprising a negative feedback circuit having a time contsant longer than the cyclic period, and means for discharging said sweep condenser comprising a pair of alternately conductive vacuum tubes, each tube including at least an anode, cathode and control grid, said cathodes being joined together to one end of a common resistor, a condenser connecting the anode of one tube to the grid of the other, said sweep condenser joining the anode of the other tube to the other end of said common resistor.

16. In an oscilloscope system, a sweep condenser, separate circuits for cyclically charging and discharging said condenser, both of said circuits including negative feedback means having time constants of the same order as the cyclic period.

17. In an oscilloscope system, a sweep condenser, separate circuits for cyclically charging and discharging said condenser, and means for rendering contant the charging rate of said condenser, comprising a negative feedback circuit having a time constant longer than the cyclic period, and additional means for rendering constant the discharge rate of said condenser.

18. In an oscilloscope system, a sweep condenser, a circuit for cyclically charging and discharging said sweep condenser, means for rendering constant the charging rate of said sweep condenser comprising in series therewith an impedance and a first space discharge device including a cathode and control grid, a grid resistor connected between said cathode and grid, and a condenser connected between said grid and the end of said impedance distant from said cathode, said grid resistor and condenser having a time constant at least as long as the charging cycle for the sweep condenser, and means for discharging said sweep condenser comprising a second and third space discharge device each having at least an anode, cathode and control grid, said cathodes being connected to one end of a common cathode resistor, grid resistors joining the grids and cathodes of each tube respectively, said second space discharge device in combination with said cathode resistor being adapted to shunt said sweep condenser, a condenser joining the grid of the second to the anode of the third discharge device and a grid condenser joining the grid of the third space discharge device to the distant end of said cathode resistor, the grid condenser and grid resistor for the third space discharge device having a time constant at least as long as the sweep condenser charging cycle.

19. In an oscilloscope system, a sweep condenser, a circuit for cyclically charging and discharging said sweep condenser, means for rendering contsant the charging rate of said sweep condenser comprising in series therewith an inductance and a first space discharge device including a cathode and control grid, a grid resistor connected between said cathode and grid, and a condenser connected between said grid and the end of said inductance distant from said cathode, said grid resistor and condenser having a time constant at least as long as the charging cycle for the sweep condenser, and means for discharging said sweep condenser at a linear rate comprising a second and third space discharge device each having at least an anode, cathode and control grid, said cathodes being connected to one end of a common cathode resistor, an inductance joining the grid and cathode of said second space discharge device, a grid resistor joining the grid and cathode of said third space discharge device, said second space discharge device in combination with said cathode resistor being adapted to shunt said sweep condenser, a condenser joining the grid of the second to the anode of the third discharge device and a grid condenser joining the grid of the third space discharge device to the distant end of said cathode resistor, the grid condenser and grid resistor for the third space discharge device having a time constant at least as long as the sweep condenser charging cycle.

20. In an oscilloscope system, a sweep condenser, a circuit for cyclically charging and discharging said sweep condenser at a controllable repetition rate, means for rendering constant the charging rate of said sweep condenser comprising in series therewith a variable impedance and a first space discharge device including a cathode and control grid, a grid resistor connected between said cathode and grid, and a condenser connected between said grid and the end of said impedance distant from said cathode, said grid resistor and condenser having a time constant at least as long as the charging cycle for the sweep condenser, and means for discharging said sweep condenser comprising a second space discharge device, an anode, and a cathode and control grid, and means for terminating the charge applied to the sweep condenser after a predetermined time interval comprising a variable grid resistor joining the grid and cathode of said second space discharge device, said second space discharge device being adapted to shunt said sweep condenser, said repetition rate thus being controlled jointly by said variable impedance and said variable grid resistor.

21. In combination in an oscilloscope system, a first space discharge device, a second and a third space discharge device each having an anode, cathode and grid, a variable sweep condenser, a circuit for cyclically charging and discharging said sweep condenser at a controllable repetition rate, means for rendering constant the charging rate of said sweep condenser comprising in series therewith a variable resistor, the space path of said first space discharge device and a source of voltage, means for discharging said sweep condenser including in shunt thereto the space path of said second space discharge device, a second resistor connecting the cathode and grid of said second space discharge device, said latter device being subject to the control of said third space discharge device, a second variable condenser joining the grid of said second to the anode of said third space discharge device, and means for varying said repetition rate comprising means for jointly controlling the capacitance of said two variable condensers in combination with means for jointly controlling said two variable resistors.

22. In combination in an oscilloscope system, a first space discharge device, a second space discharge device, a third space discharge device, a sweep condenser, a circuit for cyclically charging said condenser to a predetermined maximum voltage, means for rendering constant the charging rate of said condenser comprising in series therewith an impedance, the space path of said first space discharge device and a source of voltage, means for discharging said condenser including in shunt thereto the space path of said second space discharge device, and means comprising said third space discharge device for rendering said second space discharge device conductive, said third space discharge device having an element also connected to said source of voltage, and means for predetermining said maximum voltage comprising means for varying the voltage of said source.

23. In combination, a first space discharge device, a second space discharge device, a third space discharge device, a condenser, a circuit for cyclically charging said condenser to a desired maximum voltage at a controllable repetition rate, means for rendering constant the charging rate of said condenser comprising in series therewith an impedance, the space path of said first space discharge device and a source of voltage, means for discharging said condenser including in shunt thereto the space path of said second space discharge device, and means comprising said third space discharge device for rendering said second space discharge device conductive, said third space discharge device having an element also connected to said source of voltage and means for determining said maximum voltage independently of the charging repetition rate comprising means for varying the voltage of said source.

24. In an oscilloscope system for continuously observing a repeated signal, a sweep condenser, circuits for cyclically charging and discharging said condenser, said charging circuit including means for rendering constant the charging rate of said condenser, and means for discharging said condenser at a controllable repetition rate, both of said means including negative feedback circuits having time constants of the same order as the period of said repetition rate, the periods of said repetition rate and of said signals having a ratio of not less than 50.

25. In an oscilloscope system for continuously observing a repeated signal, a sweep condenser, circuits for cyclically charging and discharging said condenser, said charging circuit including means for rendering constant the charging rate of said condenser, and means for discharging said condenser at a controllable repetition rate, both of said means including negative feedback circuits having time constants of the same order as the period of said repetition rate, the periods of said repetition rate and of said signals having a ratio of not less than 100.

26. In an oscilloscope system, a pair of vacuum tubes each of which has, at least, an anode, cathode, and control grid, a sweep condenser, a circuit for cyclically charging said sweep condenser which includes in series therewith, in order, an impedance and the space paths of said pair of vacuum tubes, grid resistors connected between the grids and cathodes of each of said tubes, and negative feedback means for rendering constant the charging rate of said sweep condenser which comprises grid condensers connected from the end of said impedance distant from said tubes to the grid of each tube respectively, the grid resistor and grid condenser combination for each tube having a time constant of the same order as the cyclic period.

27. A system for providing a constant flow of direct current to a variable load circuit, which comprises a pair of vacuum tubes each of which has, at least, an anode, cathode and control grid and an impedance, a source of current in series with said load, and, in order, the space paths of said pair of vacuum tubes and said impedance, grid resistors connecting the grid and cathode of each tube, and means for maintaining constancy of said current flow which comprises negative feedback condensers connected between the distant end of said impedance and the grid of each tube respectively, the condenser and resistance in combination for each tube having time constants of the same order as the variations in load.

28. A system for providing a constant flow of direct current to a load circuit, which comprises a pair of vacuum tubes each having, at least, an anode, cathode and control grid and an impedance, a source of current in series with said load, and, in order, the space paths of said pair of vacuum tubes and said impedance, grid resistors connecting the grid and cathode of each tube, and means for maintaining constancy of said current flow which comprises condensers connected between the distant end of said impedance and the grid of each tube respectively.

WILLIAM D. CANNON.

REFERENCES CITED

The following references are of record in the file of this patent:

UNITED STATES PATENTS

| Number | Name | Date |
|---|---|---|
| 2,085,100 | Knowles et al. | June 29, 1937 |
| 2,174,234 | Cawein | Sept. 26, 1939 |
| 2,180,365 | Norton | Nov. 21, 1939 |
| 2,286,894 | Browne | June 16, 1942 |
| 2,315,040 | Bode | Mar. 30, 1943 |
| 2,382,243 | Livingston | Aug. 14, 1945 |
| 2,394,891 | Bowie | Feb. 12, 1946 |
| 2,407,898 | Norgaard | Sept. 17, 1946 |
| 2,410,745 | Pugsley | Nov. 5, 1946 |
| 2,426,256 | Zener | Aug. 26, 1947 |
| 2,452,213 | Sontheimer | Oct. 26, 1948 |
| 2,473,915 | Slepian et al. | June 21, 1949 |

OTHER REFERENCES

Scoyoc "Current Stabilizers," Proc. I. R. E. pp. 415 to 417, vol. 32, No. 7, July 1944.